United States Patent
Seo et al.

(10) Patent No.: US 10,153,515 B2
(45) Date of Patent: Dec. 11, 2018

(54) NONAQUEOUS ELECTROLYTE FOR LITHIUM SECONDARY BATTERY AND LITHIUM SECONDARY BATTERY EMPLOYING THE SAME

(71) Applicants: Samsung Electronics Co., Ltd., Suwon-si, Gyeonggi-do (KR); Samsung SDI Co., Ltd., Yongin-si, Gyeonggi-do (KR)

(72) Inventors: Jinah Seo, Suwon-si (KR); Dongyoung Kim, Yongin-si (KR); Hosang Park, Seoul (KR); Yoonsok Kang, Seongnam-si (KR); Insun Park, Suwon-si (KR)

(73) Assignees: SAMSUNG ELECTRONICS CO., LTD., Gyeonggi-Do (KR); SAMSUNG SDI CO., LTD., Gyeonggi-Do (KR)

(*) Notice: Subject to any disclaimer, the term of this patent is extended or adjusted under 35 U.S.C. 154(b) by 114 days.

(21) Appl. No.: 15/082,196

(22) Filed: Mar. 28, 2016

(65) Prior Publication Data

US 2017/0117580 A1  Apr. 27, 2017

(30) Foreign Application Priority Data

Oct. 23, 2015  (KR) .................. 10-2015-0148029

(51) Int. Cl.
*H01M 10/0567* (2010.01)
*H01M 10/0569* (2010.01)
(Continued)

(52) U.S. Cl.
CPC ... *H01M 10/0567* (2013.01); *H01M 10/0525* (2013.01); *H01M 10/0568* (2013.01);
(Continued)

(58) Field of Classification Search
CPC ......... H01M 10/0567; H01M 10/0525; H01M 10/0569; H01M 10/0568; H01M 2220/30; H01M 2300/0025
See application file for complete search history.

(56) References Cited

U.S. PATENT DOCUMENTS

| 7,387,716 B2 | 6/2008 | Ehrismann et al. |
| 2003/0148188 A1* | 8/2003 | Umemoto ............ C07D 241/02 429/310 |

(Continued)

FOREIGN PATENT DOCUMENTS

| KR | 101135500 B1 | 4/2012 |
| KR | 1020140076325 A | 6/2014 |

OTHER PUBLICATIONS

Choi et al., "Recent advances in the electrolytes for interfacial stability of high-voltage cathodes in lithium-ion batteries", RSC Advances, vol. 5, 2015, pp. 2732-2748.

(Continued)

*Primary Examiner* — Osei K Amponsah
(74) *Attorney, Agent, or Firm* — Cantor Colburn LLP

(57) ABSTRACT

A nonaqueous electrolyte for a lithium secondary battery, the nonaqueous electrolyte including: a fluorine-containing lithium salt, an organic solvent, and an organosilicon compound represented by Formula 1:

Formula 1

(Continued)

wherein, in Formula 1, $R_1$ to $R_6$ are each independently a $C_1$-$C_{10}$ alkyl group or a $C_1$-$C_{10}$ alkoxy group. Also a lithium secondary battery including the nonaqueous electrolyte.

7 Claims, 4 Drawing Sheets

(51) Int. Cl.
    *H01M 10/0525*      (2010.01)
    *H01M 10/0568*      (2010.01)
(52) U.S. Cl.
    CPC .... *H01M 10/0569* (2013.01); *H01M 2220/30* (2013.01); *H01M 2300/004* (2013.01); *H01M 2300/0025* (2013.01)

(56) References Cited

U.S. PATENT DOCUMENTS

| | | |
|---|---|---|
| 2007/0205098 A1 | 9/2007 | Ehrismann et al. |
| 2012/0082890 A1 | 4/2012 | Dong et al. |
| 2012/0135307 A1 | 5/2012 | Son et al. |
| 2013/0273426 A1 | 10/2013 | Lim et al. |
| 2015/0010831 A1 | 1/2015 | Noguchi et al. |
| 2015/0050551 A1 | 2/2015 | Ishiji |
| 2015/0194701 A1 | 7/2015 | Kim et al. |

OTHER PUBLICATIONS

Lee et al., "Comparison of Voltammetric Responses over the Cathodic Region in LiPF6 and LiBETI with and without HF", Journal of the Electrochemical societ, 452(6), 2005, pp. A1193-A1198.

Zhang et al., "A review on electrolyte additives for litnium-ion batteries", Journal of Power Sources, vol. 162, 2006, pp. 1379-1394.
Non-Final Office Action dated May 11, 2018 for U.S. Appl. No. 15/082,282.

* cited by examiner

NONAQUEOUS ELECTROLYTE FOR LITHIUM SECONDARY BATTERY AND LITHIUM SECONDARY BATTERY EMPLOYING THE SAME

CROSS-REFERENCE TO RELATED APPLICATION

This application claims the benefit of and priority to Korean Patent Application No. 10-2015-0148029, filed on Oct. 23, 2015, in the Korean Intellectual Property Office, and all the benefits accruing therefrom under 35 U.S.C. § 119, the content of which is incorporated herein in its entirety by reference.

BACKGROUND

1. Field

The present disclosure relates to a nonaqueous electrolyte for a lithium secondary battery and a lithium secondary battery employing the same.

2. Description of the Related Art

Recently, lithium secondary batteries have drawn significant attention as power sources for small portable electronic devices. Lithium batteries using a nonaqueous electrolyte have high energy density by exhibiting a discharge voltage that is about twice or higher than that of batteries using an aqueous alkali electrolyte.

In lithium secondary batteries, lithium-transition metal oxides, such as $LiCoO_2$, $LiMn_2O_4$, or $LiNi_{1-x}Co_xO_2$ (wherein $0<x<1$), which have a structure that allows intercalation of lithium ions, are mainly used as positive active materials.

In lithium secondary batteries, various forms of carbonaceous materials, including artificial graphite, natural graphite, hard carbon, silicon, or a combination thereof, which allow intercalation and deintercalation of lithium ions, have been used as negative active materials.

As for a nonaqueous electrolyte in a lithium secondary battery, a lithium salt dissolved in an organic solvent may be used. Nonetheless, there remains a need for improved battery materials.

SUMMARY

Provided is a nonaqueous electrolyte for a lithium secondary battery including an organosilicon compound.

Provided is a lithium secondary battery including the nonaqueous electrolyte for a lithium secondary battery.

Additional aspects will be set forth in part in the description which follows and, in part, will be apparent from the description, or may be learned by practice of the presented exemplary embodiments.

According to an aspect of an exemplary embodiment, a nonaqueous electrolyte for a lithium secondary battery includes: a fluorine-containing lithium salt; an organic solvent; and an organosilicon compound represented by Formula 1:

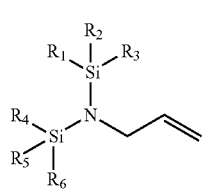

Formula 1 wherein, in Formula 1, $R_1$ to $R_6$ are each independently a $C_1$-$C_{10}$ alkyl group or a $C_1$-$C_{10}$ alkoxy group.

The amount of the organosilicon compound may be in a range of about 0.05 weight percent (wt %) to about 10 wt %, based on the total weight of the nonaqueous electrolyte.

An anion of the fluorine-containing lithium salt may include $F^-$, $BF_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $(CF_3CF_2SO_2)_2N^-$, or a combination thereof.

The nonaqueous electrolyte for a lithium secondary battery may further include an additional lithium salt, wherein an anion of the additional lithium salt may further include $Cl^-$, $Br^-$, $I^-$, $NO_3^-$, $N(CN)_2^-$, $ClO_4^-$, $CH_3CO_2^-$, $SCN^-$, or a combination thereof.

The organic solvent may include an ether, an ester, an amide, a linear carbonate, a cyclic carbonate, or a combination thereof.

The nonaqueous electrolyte for a lithium secondary battery may further include vinylene carbonate, vinyl ethylene carbonate, fluoroethylene carbonate, cyclic sulfite, saturated sultone, unsaturated sultone, acyclic sulfone, or a combination thereof.

According to an aspect of another exemplary embodiment, a lithium secondary battery includes the nonaqueous electrolyte.

BRIEF DESCRIPTION OF THE DRAWINGS

These and/or other aspects will become apparent and more readily appreciated from the following description of the exemplary embodiments, taken in conjunction with the accompanying drawings in which.

DETAILED DESCRIPTION

Figure 1:
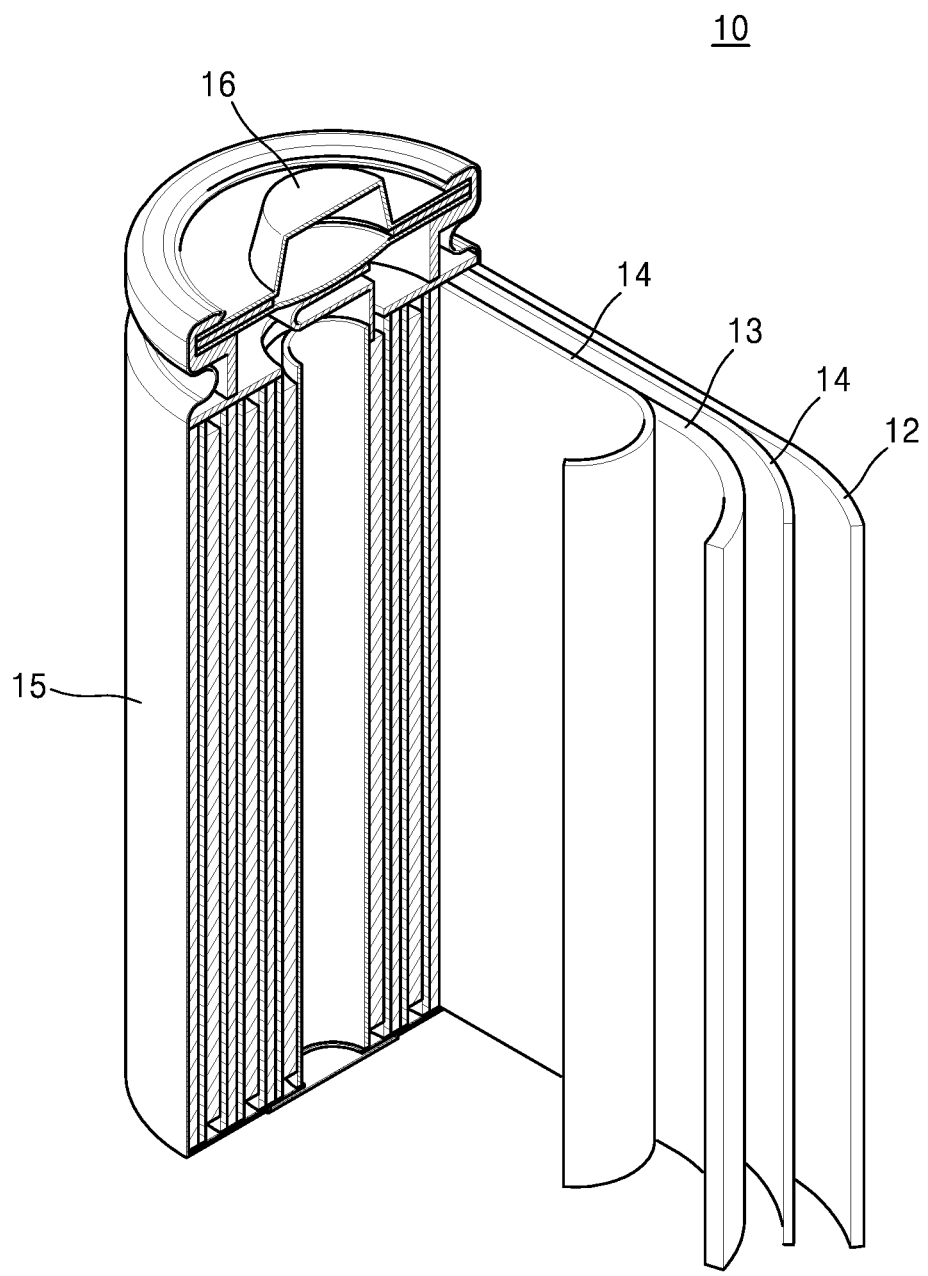
FIG. 1 is a schematic view illustrating an embodiment of a lithium secondary battery.

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects. "Or" means "and/or". As used herein, the term "and/or" includes any and all combinations of one or more of the associated listed items.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

In the present specification, the term "organosilicon compound" as used herein refers to a compound including a carbon-silicon (C—Si) bond.

In the present specification, the term "alkyl group" as used herein refers to a completely saturated, branched, or unbranched (or a straight or linear) hydrocarbon group. Non-limiting examples of the "alkyl group" may include a methyl group, an ethyl group, an n-propyl group, an iso-propyl group, an n-butyl group, an isobutyl group, a sec-butyl group, an n-pentyl group, an isopentyl group, a neo-pentyl group, an iso-amyl group, an n-hexyl group, a 3-methyl hexyl group, a 2,2-dimethylpentyl group, a 2,3-dimethylpentyl group, and an n-heptyl group.

In the present specification, the term "substituted alkyl group" refers to an alkyl group, in which a hydrogen atom is substituted with a substituent other than hydrogen, such as a halogen atom, an alkyl group, a cycloalkyl group, an alkoxy group, an aryl group, an oxygen atom, a sulfur atom, or a nitrogen atom.

In the present specification, the term "alkoxy group" refers to an alkyl group bound to oxygen via a single bond. Non-limiting examples of the "alkoxy group" may include a methoxy group, an ethoxy group, a propoxy group, a butoxy group, and a pentoxy group.

In the present specification, the term "substituted alkoxy group" refers to an alkoxy group, in which a hydrogen atom is substituted with a substituent other than hydrogen, such as a halogen atom, an alkyl group, a cycloalkyl group, another alkoxy group, an aryl group, an oxygen atom, a sulfur atom, or a nitrogen atom.

In the present specification, the term "discharging" refers to a process of removing lithium ions from a negative electrode, e.g., deintercalation or dealloying, and the term "charging" refers to a process of incorporation of lithium ions into a negative electrode, e.g., intercalation or alloying.

As for the lithium salt in the electrolyte, a fluorine-containing lithium salt may be used. The fluorine-containing lithium salt may decompose and generate hydrogen fluoride (HF) while operating a lithium secondary battery. There is a problem that the generated HF may decompose a solid electrolyte interface (SEI) layer formed at an interface between a negative electrode and a nonaqueous electrolyte and elute metal ions from a positive electrode, thereby deteriorating battery performance. Thus there remains a need for an improved electrolyte, and for an additive which can remove HF generated while operating a battery and/or may form a stable SEI layer at an interface between a negative electrode and the nonaqueous electrolyte.

Hereinafter, a nonaqueous electrolyte for a lithium secondary battery according to an exemplary embodiment and a lithium secondary battery including the nonaqueous electrolyte for a lithium secondary battery will be described in further detail.

A nonaqueous electrolyte for a lithium secondary battery according to an exemplary embodiment may include a fluorine-containing lithium salt, an organic solvent, and an organosilicon compound represented by Formula 1:

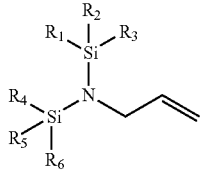

Formula 1 wherein, in Formula 1, $R_1$ to $R_6$ may be each independently a substituted or unsubstituted $C_1$-$C_{10}$ alkyl group, such as a $C_1$-$C_6$ alkyl group, or a substituted or unsubstituted $C_1$-$C_{10}$ alkoxy group, such as a $C_1$-$C_6$ alkoxy group.

In the case that the number of carbons in $R_1$, $R_2$, $R_3$, $R_4$, $R_5$, or $R_6$ is greater than 10, the ion conductivity of the nonaqueous electrolyte for a lithium secondary battery may be excessively reduced.

Since the organosilicon compound contains a silicon-nitrogen (Si—N) bond, hydrogen fluoride (HF), which may be generated from decomposition of the fluorine-containing lithium salt while operating a lithium secondary battery, may be removed. While not wanting to be bound by theory, the organosilicon compound may react with HF, and thus a Si—N bond in the organosilicon compound may break, thereby forming a silicon-fluorine (Si—F) bond. That is, the organosilicon compound may scavenge HF. Accordingly, the organosilicon compound may be a solution to a problem, which may be caused by HF, the problem being decomposition of a solid electrolyte interface (SEI) layer formed at an interface between a negative electrode and a nonaqueous electrolyte and elution of metal ions from a positive electrode, which leads to deterioration of battery performance.

Furthermore, since the organosilicon compound contains a carbon-carbon double bond (i.e., a C=C bond), a stable SEI layer may be formed at an interface between a negative electrode and a nonaqueous electrolyte, by accepting electrons from a negative electrode, which may lead to homopolymerization of the organosilicon compound, while operating a lithium secondary battery. While not wanting to be bound by theory, a C=C bond contained in the organosilicon compound may accept electrons from a negative electrode, and then may break, forming a radical. The radical may react with other peripheral C=C bonds, thus forming a homopolymer. Accordingly, the organosilicon compound may improve the lifespan and stability of a lithium secondary battery employing the organosilicon compound as a nonaqueous electrolyte element (for example, as an additive).

The amount of the organosilicon compound may be in a range of about 0.05 percent by weight (wt %) to about 10 wt %, or 0.1 wt % to 8 wt %, or 0.4 wt % to 6 wt %, or 1.0 wt % to 5 wt %, based on the total weight of the nonaqueous electrolyte for a lithium secondary battery. When the amount of the organosilicon compound is within this range, a lithium secondary battery with improved capacity characteristics and lifespan characteristics and reduced resistance may be obtained.

The concentration of the lithium salt may be in a range of about 0.6 moles per liter (M) to about 2 M, or about 0.7 M to about 1.6 M, or about 0.8 M to about 1.5 M. When the concentration of the lithium salt is within this range (i.e., about 0.6 M to about 2 M), the ion conductivity of the nonaqueous electrolyte may be improved. Thus, the performance of the nonaqueous electrolyte may be improved. In addition, the mobility of lithium ions may be improved due to an appropriate viscosity of the nonaqueous electrolyte.

An anion of the fluorine-containing lithium salt may include $F^-$, $BF_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $(CF_3CF_2SO_2)_2N^-$, or a combination thereof.

The nonaqueous electrolyte for a lithium secondary battery may further include an additional lithium salt that is used in the art. For example, an anion of the additional lithium salt may include $Cl^-$, $Br^-$, $I^-$, $NO_3^-$, $N(CN)_2^-$, $ClO_4^-$, $CH_3CO_2^-$, $SCN^-$, or a combination thereof.

The organic solvent included in the nonaqueous electrolyte may be any suitable organic solvent that is used in a nonaqueous electrolyte for a lithium secondary battery. For example, the organic solvent may be an ether, an ester, an amide, a linear carbonate, or a cyclic carbonate, which may be used alone or in combination thereof.

A representative example of the organic solvent of the nonaqueous electrolyte for a lithium secondary battery may include a cyclic carbonate, a linear carbonate, or a combination thereof. Detailed examples of the cyclic carbonate may include ethylene carbonate (EC), propylene carbonate (PC), 1,2-butylene carbonate, 2,3-butylene carbonate, 1,2-pentylene carbonate, 2,3-pentylene carbonate, vinylene carbonate, a halide thereof, and a combination thereof. In addition, detailed examples of the linear carbonate may include dimethyl carbonate (DMC), diethyl carbonate (DEC), dipropyl carbonate, ethyl methyl carbonate (EMC), methyl propyl carbonate, ethyl propyl carbonate, or a combination thereof, but embodiments are not limited thereto.

Ethylene carbonate (EC) and propylene carbonate (PC) as cyclic carbonates available as the organic solvent of the nonaqueous electrolyte are high-viscosity organic solvents with a high dielectric constant and thus may facilitate dissociation of the lithium salt in the nonaqueous electrolyte. Such a cyclic carbonate may be mixed with a linear carbonate, such as DMC and DEC, having low viscosity and low dielectric constant in an appropriate ratio to prepare a nonaqueous electrolyte having improved electric conductivity.

In addition, examples of the ether available as the organic solvent may include 1,1,2,2-tetrafluoroethyl-1H,1H,5H-octafluoropentyl ether, dimethyl ether, diethyl ether, dipropyl ether, methyl ethyl ether, methyl propyl ether, ethyl propyl ether, or a combination thereof, but embodiments are not limited thereto.

Examples of the ester available as the organic solvent may include methyl acetate, ethyl acetate, propyl acetate, methyl propionate, ethyl propionate, propyl propionate, γ-butyrolactone, γ-valerolactone, γ-caprolactone, σ-valerolactone, ε-caprolactone, or a combination thereof, but embodiments are not limited thereto.

The nonaqueous electrolyte for a lithium secondary battery may further include an additive to form a solid electrolyte interface (SEI) layer. Examples of the additive to form the SEI layer may include vinylene carbonate, vinyl ethylene carbonate, fluoroethylene carbonate, a cyclic sulfite, a saturated sultone, an unsaturated sultone, an acyclic sulfone, or a combination thereof, but embodiments are not limited thereto.

Examples of the cyclic sulfite may include ethylene sulfite, methyl ethylene sulfite, ethyl ethylene sulfite, 4,5-dimethyl ethylene sulfite, 4,5-diethyl ethylene sulfite, propylene sulfite, 4,5-dimethyl propylene sulfite, 4,5-diethyl propylene sulfite, 4,6-dimethyl propylene sulfite, 4,6-diethyl propylene sulfite, 1,3-butylene glycol sulfite, or a combination thereof. Examples of the saturated sultone may include 1,3-propane sultone, 1,4-butane sultone, or a mixture thereof. Examples of the unsaturated sultone may include ethene sultone, 1,3-propene sultone, 1,4-butene sultone, 1-methyl-1,3-propene sultone, or a combination thereof. Examples of the acyclic sulfone may include divinyl sulfone, dimethyl sulfone, diethyl sulfone, methyl ethyl sulfone, methyl vinyl sulfone, or a combination thereof.

The amount of the additive to form an SEI layer may be appropriately chosen according to a type of the additive. For example, the amount of the additive to form an SEI layer may be in a range of about 0.01 part by weight to about 10 parts by weight, or about 0.1 parts by weight to about 8 parts by weight, or about 1 part by weight to about 5 parts by weight, based on the total weight of the nonaqueous electrolyte for a lithium secondary battery.

According to another aspect of the present disclosure, a lithium secondary battery includes a nonaqueous electrolyte for a lithium secondary battery according to any of the above-described embodiments.

For example, the lithium secondary battery may be manufactured by injecting a nonaqueous electrolyte according to any of the above-described embodiments into an electrode assembly including a positive electrode, a negative electrode, and a separator between the positive electrode and the negative electrode. The positive electrode and the negative electrode may be each manufactured by mixing an active material, a binder, and a conductive agent with a solvent to prepare a slurry, coating the slurry on a current collector, such as aluminum, and drying and pressing the resulting product.

The positive active material may include a lithium-containing transition metal oxide. For example, the positive active material may include $Li_xCoO_2$ (wherein $0.5<x<1.3$), $Li_xNiO_2$ (wherein $0.5<x<1.3$), $Li_xMnO_2$ (wherein $0.5<x<1.3$), $Li_xMn_2O_4$ (wherein $0.5<x<1.3$), $Li_x(Ni_aCo_bMn_c)O_2$ (wherein $0.5<x<1.3$, $0<a<1$, $0<b<1$, $0<c<1$, and $a+b+c=1$), $Li_xNi_{1-y}Co_yO_2$ (wherein $0.5<x<1.3$ and $0<y<1$), $Li_xC_{1-y}Mn_yO_2$ (wherein $0.5<x<1.3$ and $0\leq y<1$), $Li_xNi_{1-y}Mn_yO_2$ (wherein $0.5<x<1.3$ and $0\leq y<1$), $Li_x(Ni_aCo_bMn_c)O_4$ (wherein $0.5<x<1.3$, $0<a<2$, $0<b<2$, $0<c<2$, and $a+b+c=2$), $Li_xMn_{2-z}Ni_zO_4$ (wherein $0.5<x<1.3$ and $0<z<2$), $Li_xMn_{2-z}Co_zO_4$ (wherein $0.5<x<1.3$ and $0<z<2$), $Li_xCoPO_4$ (wherein $0.5<x<1.3$), $Li_xFePO_4$ (wherein $0.5<x<1.3$), or a combination thereof. The lithium-containing transition metal oxide may be coated with a metal such as aluminum (Al) or a metal oxide. Alternatively, the positive active material may include a lithium-containing transition metal sulfide, a lithium-containing transition metal selenide, a lithium-containing transition metal halide, or a combination thereof, in addition to or in place of the lithium-containing transition metal oxide.

Typical examples of the negative active material may include a carbonaceous material, a lithium metal, silicon, or tin that allows intercalation and deintercalation of lithium ions. For example, a metal oxide, such as $TiO_2$, $SnO_2$, or the like having a potential of less than 2 Volts (V) versus lithium may also be used as the negative active material. For example, the negative active material may be a carbonaceous material, including a low-crystalline, e.g., amorphous, carbon and/or a high-crystalline carbon. Representative examples of the low-crystalline carbon are soft carbon and hard carbon. Representative examples of the high-crystalline carbon are high-temperature sintered carbon, such as natural graphite, artificial graphite, kish graphite, pyrolytic carbon, mesophase pitch-based carbon fiber, meso-carbon microbeads, mesophase pitches, and petroleum or coal tar pitch derived cokes.

The binder may bind the active material and the conductive agent together to fix them to a current collector. The binder may be any suitable binder used in lithium secondary batteries, such as polyvinylidene fluoride (PVdF), polypropylene, carboxymethylcellulose, polyvinylpyrrolidone, tetrafluoroethylene, polyethylene, polyvinyl alcohol, or styrene butadiene rubber.

The conductive agent may include artificial graphite; natural graphite; acetylene black; Ketjen black; channel black; lamp black; thermal black; electrical conductive fibers, such as carbon fibers and metallic fibers; electrical conductive metal oxides, such as titanium oxide; and metal powders, such as aluminum or nickel.

Examples of the separator may include a single olefin, such as polyethylene (PE) and polypropylene (PP), an olefin composite, polyamide (PA), polyacrylonitrile (PAN), polyethylene oxide (PEO), polypropylene oxide (PPO), polyethylene glycol diacrylate (PEGA), polytetrafluoroethylene (PTFE), PVdF, or polyvinyl chloride (PVC).

The lithium secondary battery according to an embodiment may have any shape, for example, a cylindrical type using a can, a rectangular type, a pouch type, or a coin type.

FIG. 1 is a schematic view illustrating an embodiment of a lithium secondary battery 10. Referring to FIG. 1, the lithium secondary battery 10 may include a positive electrode 13, a negative electrode 12, and a separator 14.

The positive electrode 13, the negative electrode 12, and the separator 14 may be wound or folded and be accommodated in a battery case 15. Then, a nonaqueous electrolyte (not shown) may be injected into the battery case 15, and a cap assembly 16 may seal the battery case 15, thereby manufacturing the lithium secondary battery 10. The battery case 15 may be a cylindrical type, a rectangular type, or a thin-film type. For example, the lithium secondary battery 10 may be a large thin-film type battery.

The disclosure will now be described in greater detail with reference to the following examples. However, the following examples are for illustrative purposes only and shall not limit the scope of this disclosure.

EXAMPLES

Example 1

Preparation of Nonaqueous Electrolyte 40 wt % of 1,1,2,2-tetrafluoroethyl-1H,1H,5H-octafluoropentyl ether (HFE), 45 wt % of dimethyl carbonate (DMC), 15 wt % of fluoroethylene carbonate (FEC) were mixed together to obtain a mixture solution. Subsequently, $LiPF_6$ as a lithium salt and N-allyl-N,N-bis(trimethylsilyl) amine represented by Formula 2 as an organosilicon compound were added to the mixture solution. As a result, a nonaqueous electrolyte having a $LiPF_6$ concentration of about 1.3 M and 1 wt % of N-allyl-N,N-bis(trimethylsilyl) amine was obtained.

Formula 2

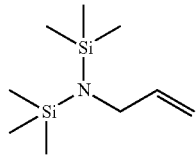

Preparation of Cylindrical Cell $Li_{1.2}Ni_{0.13}Co_{0.13}Mn_{0.54}O_2$ (OLO) as a positive active material, PVdF as a binder, and Denka black as a conductive agent were mixed together in a weight ratio of about 92:4:4 to obtain a solid mixture. This solid mixture was dispersed in N-methyl-2-pyrrolidone (NMP) to prepare a positive active material layer composition. The positive active material layer composition was coated on an aluminum foil having a thickness of about 15 micrometers (μm), dried the coated aluminum foil in an oven set at about 90° C. for about 2 hours, and then further dried the coated aluminum foil in a vacuum oven at about 120° C. for about 2 hours to completely evaporate the solvent. The resulting product was then pressed and punched, thereby manufacturing a positive electrode.

The positive electrode, a silicon negative electrode (manufactured using a silicon-carbon composite negative active material according to Korean Patent Application 2013-0080493), a polypropylene separator (available from Teijin Co., Ltd.), and the nonaqueous electrolyte prepared in Example 1 as described above were used to manufacture a 18650 cylindrical cell.

Comparative Example 1

Preparation of Nonaqueous Electrolyte 40 wt % of HFE, 45 wt % of DMC, 15 wt % of FEC were mixed together to obtain a mixture solution. Then, $LiPF_6$ as a lithium salt was added to the mixture solution. As a result, a nonaqueous electrolyte having a $LiPF_6$ concentration of about 1.3 M was obtained.
(Preparation of Cylindrical Cell)
A cylindrical cell was manufactured in the same manner as in Example 1, except that the nonaqueous electrolyte prepared in Comparative Example 1 was used instead of the nonaqueous electrolytes prepared in Example 1.

Evaluation Example

Evaluation Example 1: Evaluation on Specific Capacity and Capacity Retention

A charge-discharge test was performed using the cylindrical cells manufactured in Example 1 and Comparative Example 1 in the following manner.

First, each of the cylindrical cells was charged at about 25° C. with a constant current of about 0.05 C to a voltage of about 4.55 Volts (V). Subsequently, each of the cylindrical cells was discharged with a constant current of about 0.05 C to a discharge voltage of about 2.0 V (First cycle of formation process). The C rate is a discharge rate of a cell, and is obtained by dividing a total capacity of the cell by a total discharge period of time" as the definition of C rate, e.g., a C rate for a battery having a discharge capacity of 1.6 ampere-hours would be 1.6 amperes.

Next, each of the cylindrical cells was charged at about 25° C. with a constant current of about 0.1 C to a voltage of about 4.55 V. Subsequently, each of the cylindrical cells was discharged with a constant current of about 0.1 C to a discharge voltage of about 2.0 V (Second cycle of formation process). This cycle was repeated one more time (Third cycle of formation process).

The cylindrical cell after the formation process was charged at about 25° C. with a constant current of about 1 C to a voltage of about 4.55 V. Subsequently, each of the cylindrical cells was discharged with a constant current of about 1 C to a discharge voltage of about 2.0 V, followed by discharge capacity measurement. This discharge capacity was recorded as a $1_{st}$ cycle discharge capacity or an initial capacity. This charge and discharge cycle was repeated 100 times.

A discharge capacity measured at every cycle was recorded as a specific capacity.

A capacity retention of each cylindrical cell was calculated based on the discharge capacity measured at each cycle using Equation 1:

Capacity retention (%)=($n^{th}$-cycle discharge capacity/
$1^{st}$ cycle discharge capacity)×100%   Equation 1 wherein, in Equation 1, n is an integer selected from 1 to 100.

In addition, the specific capacities and capacity retentions at $100^{th}$ cycle of the cylindrical cells manufactured in Example 1 and Comparative Example 1 are represented in Table 1.

TABLE 1

| | Specific capacity (mAhg$^{-1}$) @$100^{th}$ cycle | Capacity retention (%) @$100^{th}$ cycle |
|---|---|---|
| Example 1 | 143.0 | 70.9 |
| Comparative Example 1 | 117.5 | 58.3 |

Referring to Table 1, it was found that the cylindrical cells manufactured in Example 1 exhibited very high specific capacities and capacity retentions at $100^{th}$ cycle, as compared with those of the cylindrical cell of Comparative Example 1.

Figure 2:
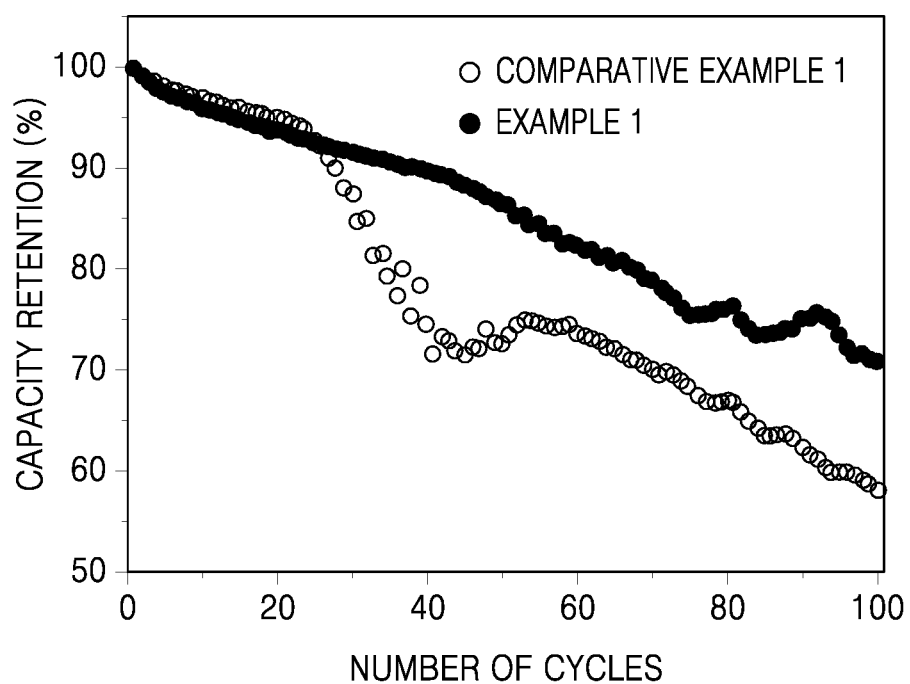
FIG. 2 is a graph of capacity retention (percent, %) versus number of charging and discharging cycles, illustrating lifespan characteristics of cylindrical cells manufactured in Example 1 and Comparative Example 1.

In addition, the changes of capacity retention of cylindrical cells manufactured in Example 1 and Comparative Example 1 with respect to the number of cycles are shown in FIG. 2.

Referring to FIG. 2, the cylindrical cell manufactured in Example 1 was found to have a smaller width of decrease in capacity retention with respect to the number of cycles, compared to the cylindrical cell manufactured in Comparative Example 1.

Evaluation Example 2: HF Amount Evaluation

The nonaqueous electrolyte prepared in Comparative Example 1 was stored at a temperature of about 60° C. for 7 days. The amount of HF in the nonaqueous electrolyte was measured by titration with sodium hydroxide. The result thereof is shown in Table 2 as Comparative Example 1. Further, the nonaqueous electrolyte prepared in Comparative Example 1 was stored at a temperature of about 60° C. for 7 days, followed by cooling to a temperature of about 25° C. Then, N-allyl-N,N-bis(trimethylsilyl)amine was added thereto. As a result, a nonaqueous electrolyte containing 1 wt % of N-allyl-N,N-bis(trimethylsilyl)amine was obtained. The nonaqueous electrolyte was then stored for 1 day, followed by measurement of HF in the nonaqueous electrolyte by titration with sodium hydroxide. The result thereof is shown in Table 2 as Example 1.

TABLE 2

|  | Example 1 | Comparative Example 1 |
|---|---|---|
| HF amount (parts per million (ppm) by weight) | 12 | 61 |

Referring to Table 2, the nonaqueous electrolyte prepared in Example 1 was found to have a significantly low amount of HF, as compared with the nonaqueous electrolyte prepared in Comparative Example 1.

Evaluation Example 3: Cyclic Voltammetric Curve Evaluation

Figure 3:
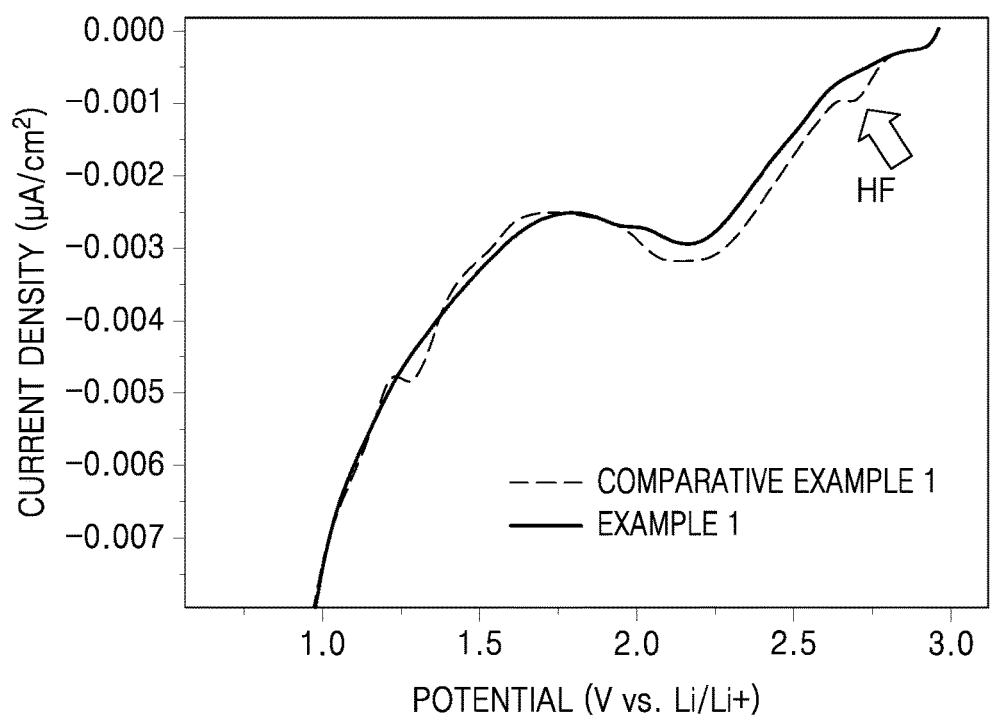
FIG. 3 is a graph of current density (microamperes per square centimeter, $\mu A/cm^2$) versus potential (Volts versus Li/Li+, V vs. Li/Li+), illustrating cyclic voltammetric curves of coin cells manufactured in Example 1 and Comparative Example 1.

Cyclic voltammetric curves of coin cells including nonaqueous electrolytes prepared in Example 1 and Comparative Example 1 were obtained, and shown in FIG. 3. The coin cells were each a 2032-type coin cell including each of the nonaqueous electrolytes, respectively. Each of the coin cells included a silicon negative electrode (manufactured using a silicon-carbon composite negative active material according to Korean Patent Application 2013-0080493) as a working electrode and lithium metal as a counter electrode and a reference electrode. The scan rate was 0.1 mV/sec.

Referring to FIG. 3, the cyclic voltammetric curve of the coin cell including the nonaqueous electrolyte prepared in Example 1 was found to exhibit a reduced HF peak at about 2.6 V, as compared with the cyclic voltammetric curve of the coin cell including the nonaqueous electrolyte prepared in Comparative Example 1. Accordingly, a lithium secondary battery including the nonaqueous electrolyte prepared in Example 1 may exhibit improved battery performance, as compared with a lithium secondary battery including the nonaqueous electrolyte prepared in Comparative Example 1.

Evaluation Example 4: Voltage Profile Evaluation

A charge-discharge test was performed using the cylindrical cells manufactured in Example 1 and Comparative Example 1 in the same manner as in Evaluation Example 1. The voltage profiles at $100^{th}$ cycle are shown in FIG. 4.

Figure 4:
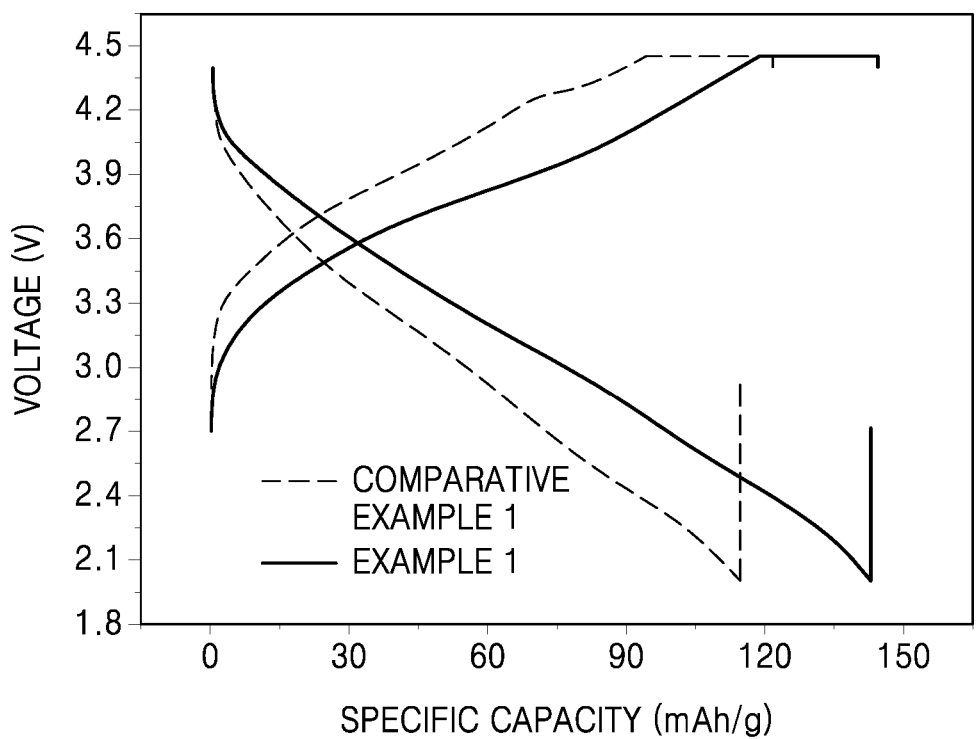
FIG. 4 is a graph of voltage (Volts, V) versus specific capacity (milliampere-hours per gram, mAh/g) for the $100^{th}$ cycle of cylindrical cells manufactured in Example 1 and Comparative Example 1.

Referring to FIG. 4, the cylindrical cell manufactured in Example 1 was found to have reduced resistance, as compared with the cylindrical cell manufactured in Comparative Example 1.

A nonaqueous electrolyte for a lithium secondary battery according to an embodiment may improve capacity characteristics and lifespan characteristics and reduce the resistance of a lithium secondary battery including the nonaqueous electrolyte.

It should be understood that exemplary embodiments described herein should be considered in a descriptive sense only and not for purposes of limitation. Descriptions of features or aspects within each exemplary embodiment should be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. A nonaqueous electrolyte for a lithium secondary battery, the nonaqueous electrolyte comprising:
a fluorine-containing lithium salt;
an organic solvent; and
an organosilicon compound represented by Formula 1

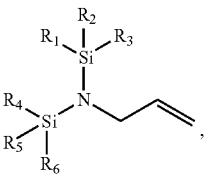

Formula 1 wherein, in Formula 1, $R_1$ to $R_6$ are each independently a $C_1$-$C_{10}$ alkyl group or a $C_1$-$C_{10}$ alkoxy group.

2. The nonaqueous electrolyte of claim 1, wherein an amount of the organosilicon compound is in a range of about 0.05 percent by weight to about 10 percent by weight, based on a total weight of the nonaqueous electrolyte.

3. The nonaqueous electrolyte of claim 1, wherein an anion of the fluorine-containing lithium salt comprises $F^-$, $BF_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $(CF_3CF_2SO_2^-)_2N^-$, or a combination thereof.

4. The nonaqueous electrolyte of claim 1, further comprising an additional lithium salt, wherein an anion of the additional lithium salt comprises $Cl^-$, $Br^-$, $I^-$, $NO_3^-$, $N(CN)_2^-$, $ClO_4^-$, $CH_3CO_2^-$, $SCN^-$, or a combination thereof.

5. The nonaqueous electrolyte of claim 1, wherein the organic solvent comprises an ether, an ester, an amide, a linear carbonate, a cyclic carbonate, or a combination thereof.

6. The nonaqueous electrolyte of claim 1, further comprising vinylene carbonate, vinyl ethylene carbonate, fluoroethylene carbonate, a cyclic sulfite, a saturated sultone, an unsaturated sultone, an acyclic sulfone, or a combination thereof.

7. A lithium secondary battery comprising the nonaqueous electrolyte according to claim 1.

* * * * *